Feb. 4, 1930.  C. M. CONRAD  1,745,605
COFFEEPOT
Filed May 28, 1927  2 Sheets-Sheet 2
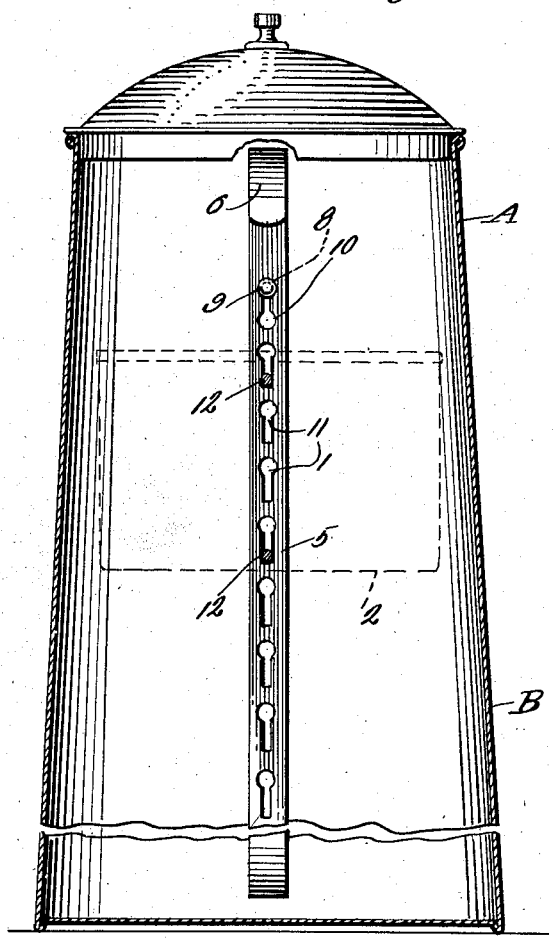
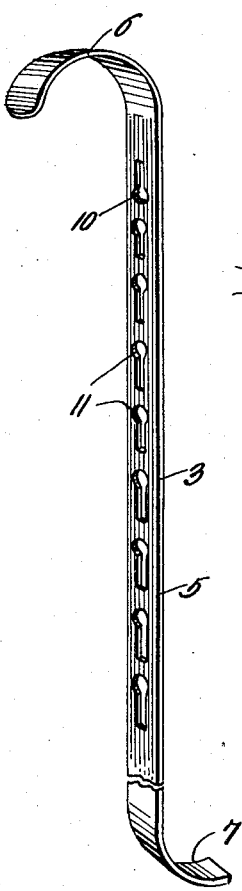
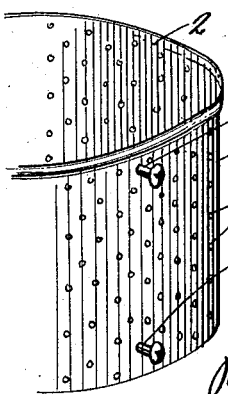
INVENTOR.
CHARLES M. CONRAD
BY
ATTORNEYS.

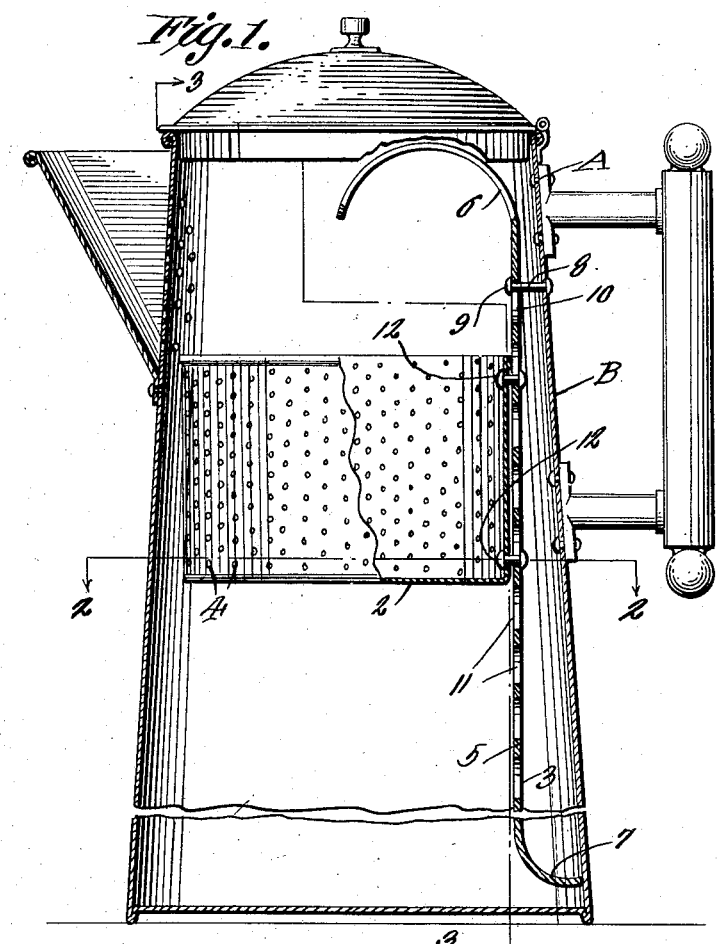
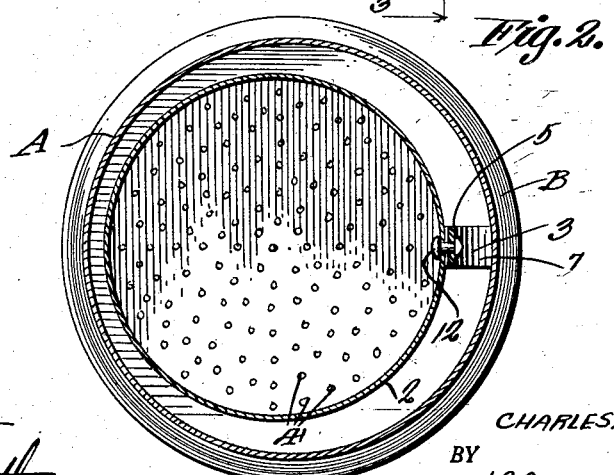

Patented Feb. 4, 1930

1,745,605

UNITED STATES PATENT OFFICE

CHARLES M. CONRAD, OF FORT LAUDERDALE, FLORIDA

COFFEEPOT

Application filed May 28, 1927. Serial No. 195,052.

This invention relates to a percolator and more particularly to that type of percolator utilized in the making of coffee and has for its primary object the construction of a device that may be readily arranged within a coffee pot for adjustably supporting the quantity of coffee in a predetermined position relative to the level of the water within the coffee pot.

Another object of the invention is the construction of a percolator with an adjustable container adjustable so as to support coffee at various levels relative to the level of the water in the coffee pot.

Another object of the invention is the construction of a percolator of two major parts adjustably related with one part adjustably associated with and detachably connected with the coffee pot in which the percolator is arranged.

A feature of the invention is the novel manner of constructing and associating the various parts so as to considerably reduce production cost and to greatly facilitate the assembling of the parts.

With these and other objects in view the invention will be better understood from the following detailed description taken in connection with the accompanying drawings, wherein:

Figure 1 is a vertical view of a coffee pot showing my improved percolator applied thereto and partially in section, Figure 2 is a sectional view on the line 2—2 of Figure 1, Figure 3 is a vertical sectional view on the line 3—3 of Figure 1, Figure 4 is a perspective view of the supporting strip or hanger, Figure 5 is a fragmentary view of the container.

Again referring to the drawings illustrating one of the many constructions of my invention, the letter A designates a coffee pot of a well known construction having the tapering wall formation B.

My improved construction of percolator designated in its entirety by the numeral 1 consists of two major parts, designated respectively by the numerals 2 and 3, adjustably associated so as to accommodate the positioning of the device in a coffee pot and to locate the level of the quantity of coffee supported thereby according to the level of the water in the coffee pot. The part 2 hereinafter known as the container is provided with a plurality of perforations 4 so as to allow the water to readily come into contact with the coffee contents of the container. The part 3 hereinafter known as the supporting strip or hanger is formed from a single strap of metal bent to have an intermediate portion 5 and end portion 6 formed into a handle and an end portion 7 curved laterally so as to have abutting engagement with the wall of the coffee pot when the hanger is supported in a novel manner now to be described. The upper end portion of the coffee pot has secured thereto an elongated rivet 8 the head portion 9 of which has a detachable interlocking engagement with the uppermost hole 10 of a plurality of vertically alined key hole slots 11. The key hole slots 11, are arranged to have adjustable detachable connection with a plurality of rivets 12 secured to the side wall of the container, thereby enabling the container to be positioned at any required level within the coffee pot which position is determined by the level of the water in the coffee pot.

With the arrangement of the rivet 8 as illustrated and the construction of the strip with a plurality of slots, it will be appreciated that the hanger may be readily supported from the rivet 8 to position the remaining slots for adjustable association with the rivets 12 so that in a very easy manner the position of the container 2 may be very readily changed. I wish it to be understood that the container may be used with or without a cover depending upon which is desirable in the use of the device.

With the application of my invention to a coffee pot, a pot of coffee may be more quickly prepared compared with the necessary time to prepare a pot of coffee with the usual type of percolators now on the market that will not function until the temperature of the water within the pot reaches a predetermined degree. With my improved device the quantity of coffee located in the water will be immediately acted upon by the water so as to accelerate the chemical action by the application of heat.

It is, of course to be understood that the supporting strip, or hanger, may be constructed in various other manners than illustrated and connected to the coffee pot in various ways and besides various types of containers may be associated with the hanger and therefore, I do not desire to be limited in any manner except as set forth in the following claims.

Having thus described my invention what I claim is:

1. A percolator comprising a strip adapted to rest on the base of a coffee pot provided with a plurality of slots extending along its length, and a perforated container having adjustable interlocking connections with said slots.

2. A percolator comprising a supporting strip having one end formed into a handle, an intermediate portion provided with a plurality of alined slots and a container adapted to have interlocking adjustable connection with said slots.

3. In combination with a coffee pot having an elongated rivet attached to its upper portion, a percolator consisting of a support strip having a vertical alined series of slots one of which detachably engaging the rivets, said strip further having one end formed into a handle and the other provided with an offset portion engageable with the wall of the pot, a perforated container and projecting rivets secured to said container for adjustable connection with said slots.

In testimony whereof I affix my signature.

CHARLES M. CONRAD.